US012613032B2

(12) United States Patent
Li et al.

(10) Patent No.: US 12,613,032 B2
(45) Date of Patent: Apr. 28, 2026

(54) INDUSTRIAL SOLID WASTE INCINERATOR AND FLUE GAS TREATMENT APPARATUS

(71) Applicant: Zhejiang Weiming Environment Protection Co., Ltd., Wenzhou City (CN)

(72) Inventors: Rong Li, Wenzhou City (CN); Shucui Huang, Wenzhou City (CN); Huijing Huang, Wenzhou City (CN)

(73) Assignee: Zhejiang Weiming Environment Protection Co., Ltd., Wenzhou City (CN)

( * ) Notice: Subject to any disclaimer, the term of this patent is extended or adjusted under 35 U.S.C. 154(b) by 994 days.

(21) Appl. No.: 17/836,493

(22) Filed: Jun. 9, 2022

(65) Prior Publication Data

US 2023/0114236 A1 Apr. 13, 2023

(30) Foreign Application Priority Data

Oct. 12, 2021 (CN) .......................... 202111185897.6

(51) Int. Cl.
  *F23J 15/02* (2006.01)
  *B01D 46/00* (2022.01)
  (Continued)

(52) U.S. Cl.
  CPC .......... *F23J 15/02* (2013.01); *B01D 46/0027* (2013.01); *B01D 46/02* (2013.01); *B01D 53/04* (2013.01);
  (Continued)

(58) Field of Classification Search
  CPC ........ F23J 15/02; F23J 15/003; F23J 2219/10; F23J 2219/30; F23J 15/025;
  (Continued)

(56) References Cited

U.S. PATENT DOCUMENTS 5,042,402 A * 8/1991 Freeman .................... F23G 5/20
                                                   432/103
5,052,310 A * 10/1991 Goff .......................... F23G 5/46
                                                   236/14

(Continued)

OTHER PUBLICATIONS

Air Pollution Control Regulatory & Technology Department, Alstrom, UN-ECE, Geneva, Switzerland, Nov. 17, 2003.

*Primary Examiner* — David J Laux
(74) *Attorney, Agent, or Firm* — Morse, Barnes-Brown & Pendleton, P.C.; Martin Z. Zhang

(57) ABSTRACT

The present invention discloses an industrial solid waste incinerator and flue gas treatment apparatus, comprising a water-cooled feed hopper, a water-cooled grate and a chamber which are connected in sequence. A front arch, a rear arch and side walls which are formed of membrane water-cooled walls, are provided between the water-cooled grate and the chamber, and a dechlorination tower is arranged behind the chamber. Two sets of rear secondary air pipes, which comprise an upper set of rear secondary air pipes and a lower set of rear secondary air pipes, are arranged on the rear arch, and a dry desulfurization device is arranged between the two sets of rear secondary air pipes, so that the reaction medium and the flue gas are sufficiently disturbed and mixed, and stroke is extended.

4 Claims, 2 Drawing Sheets

(51) Int. Cl.

| | |
|---|---|
| *B01D 46/02* | (2006.01) |
| *B01D 53/04* | (2006.01) |
| *B01D 53/68* | (2006.01) |
| *B01D 53/75* | (2006.01) |
| *B01D 53/79* | (2006.01) |
| *B01D 53/86* | (2006.01) |
| *F23G 5/00* | (2006.01) |
| *F23G 5/44* | (2006.01) |
| *F23J 15/00* | (2006.01) |

(52) U.S. Cl.
CPC ............. *B01D 53/68* (2013.01); *B01D 53/75* (2013.01); *B01D 53/79* (2013.01); *B01D 53/8621* (2013.01); *F23G 5/002* (2013.01); *F23G 5/44* (2013.01); *F23J 15/003* (2013.01); *B01D 2239/0407* (2013.01); *B01D 2251/30* (2013.01); *B01D 2257/2025* (2013.01); *B01D 2257/30* (2013.01); *B01D 2258/0291* (2013.01); *F23G 2200/00* (2013.01); *F23G 2201/90* (2013.01); *F23G 2205/14* (2013.01); *F23J 2219/10* (2013.01); *F23J 2219/30* (2013.01)

(58) Field of Classification Search
CPC .... F23J 2215/20; F23J 2215/30; F23J 15/006; F23J 15/06; B01D 46/0027; B01D 46/02; B01D 53/04; B01D 53/68; B01D 53/75; B01D 53/79; B01D 53/8621; B01D 2239/0407; B01D 2251/30; B01D 2257/2025; B01D 2257/30; B01D 2258/0291; B01D 47/06; B01D 2257/2045; B01D 53/508; B01D 53/70; B01D 53/8631; B01D 2253/102; B01D 2257/2064; B01D 2257/302; B01D 2257/404; B01D 2257/706; B01D 46/023; F23G 5/002; F23G 5/44; F23G 2200/00; F23G 2201/90; F23G 2205/14; F23G 5/006; F23G 7/00; F23L 9/02; F23L 9/00; Y02E 20/12

See application file for complete search history.

(56) References Cited

U.S. PATENT DOCUMENTS

| | | | |
|---|---|---|---|
| 2013/0186311 A1* | 7/2013 | Lin | F23G 5/444 |
| | | | 110/255 |
| 2016/0146452 A1* | 5/2016 | Wang | F23C 10/10 |
| | | | 122/4 R |

\* cited by examiner

INDUSTRIAL SOLID WASTE INCINERATOR AND FLUE GAS TREATMENT APPARATUS

CROSS REFERENCE TO RELATED APPLICATIONS

This patent application claims the benefit and priority of Chinese Patent Application No. 202111185897.6, entitled "INDUSTRIAL SOLID WASTE INCINERATOR AND FLUE GAS TREATMENT APPARATUS" filed on Oct. 12, 2021, the disclosure of which is incorporated by reference herein in its entirety as part of the present application.

TECHNICAL FIELD

The application relates to the technical field of boilers and flue gas treatment, and particularly to an industrial solid waste incinerator generating steam for supplying steam and generating power, and ensuring qualified emission of the flue gas by a suitable process system.

BACKGROUND ART

With the economic development of society and continuously improvement of the living standard of town dweller, living apparel such as various leathers, knit textiles and plastics, and electronic products such as mobile phones and computers have become daily necessities of residents. These products produce a large amount of industrial solid waste such as waste leathers, plastics and rubber during production and recovery. The solid waste is hardly degraded in nature, and it is easy to cause serious environment contamination. Circulating fluidized bed incineration power plants are built in many places for treating these solid wastes in manner of "subtractive quantification, resourcing, and harmless". However, problems appear, such as high requirement for fuel pretreatment in a circulating fluidized bed, and the resulted stuck of twister breaking apparatus; unreasonable arrangement of heated surfaces and the resulted severe coking; high content of sulfur and chlorine in the industrial solid waste (more than ten times higher than the municipal solid waste) and the resulted easy generation of dioxin and difficulty of ensuring qualified emission of the flue gas during practical operation, which cause difficulties in continuation of the operation of power plant. If a traditional grate of incinerator is used, the heat value of the industrial waste is approximately equal to several times the heat value of municipal solid waste, which causes problems such as the overheated grate, the high temperature of the flue gas in the chamber, the large amount of generation of dioxin and sulfide, the large amount of waste water in wet tower and the inclusion of dangerous waste materials such as dioxin which cannot be effectively treated.

SUMMARY

In order to solve the disadvantage of the prior art, achieve the object of sufficient combustion of industrial solid waste, effective utilization of heat, qualified emission of flue gas and waste water up to standard, reduction of furnace shut-downs, and guarantee of long-term stable operation, the present disclosure is configured with the following technical solutions:

An industrial solid waste incinerator and flue gas treatment apparatus, comprising a water-cooled feed hopper, a water-cooled grate and a chamber which are connected in sequence. A front arch, a rear arch and side walls, which are formed of membrane water-cooled walls, are provided between the water-cooled grate and the chamber, and a dechlorination tower is arranged behind the chamber. Two sets of rear secondary air pipes, which comprise an upper set of rear secondary air pipes and a lower set of rear secondary air pipes, are arranged on the rear arch, and a dry desulfurization device is arranged between the two sets of rear secondary air pipes, so that a reaction medium and the flue gas are sufficiently disturbed and mixed, and stroke is extended. The water-cooled grate is used to perform combustion such that the grate can be cooled timely; the front arch, the rear arch and the left and right side walls of the incinerator are formed by a membrane water-cooled walls structure, which greatly increase heated area.

Furthermore, the front arch, the rear arch and the side walls are provided with secondary air pipes, which increase proportion of the secondary air and disturbance of the flue gas.

Furthermore, an outlet pipe of the chamber is tangentially connected to a lower part of the dechlorination tower, so that the flue gas at an outlet of the chamber tangentially enters the lower part of the dechlorination tower. Liquid alkali nozzles are arranged on the upper part of the dechlorination tower, tangentially with respect a circle, such that the liquid alkali jet and the flue gas swirl flow in reverse directions. Disturbance mixing of the flue gas that has tangentially entered the dechlorination tower from the lower part and the liquid alkali tangentially entering from the upper part can be increased due to the reverse flow directions, which extend reaction time and gives sufficient settling space of flue dust.

Furthermore, the flue gas at an outlet of the dechlorination tower is sequentially filtered by a primary baghouse and a secondary denitration catalytic fabric filter, and then is discharged through an activated carbon packed tower. The flue gas treatment adopts a two-stage baghouse, wherein a first stage baghouse is configured to filter the dust and a second stage baghouse is configured to filter dust and denitrate, so that both NOx content and dust content of the flue gas at the outlet of the dechlorination tower reach an ultralow emission degree.

The advantages and benefits of the present disclosure are:

1. Regarding to the characteristics of high heat value and low moisture of industrial solid waste, a boiler adopts a water-cooled grate to perform combustion. This avoids the corrosion and coking caused by excessive heat load of conventional grate.

2. The front arch, the rear arch and the left and right side walls of the incinerator are formed by a membrane water-cooled walls structure, which greatly increase the heated area, reduces temperature of the flue gas entering the chamber, and avoids the high-temperature coking and corrosion of the heat surface of the chamber.

3. The front arch, the rear arch and the side walls are provided with a secondary air, which increases the proportion of the secondary air and the disturbance of the flue gas, and prompts the sufficient combustion of the fuel.

4. The dry desulfurization device is arranged in the secondary air of the rear arch, so that the reaction medium and the flue gas are sufficiently disturbed and mixed, the stroke is extended, and the medium reacts sufficiently, which improves the efficiency of desulfurization.

5. Disturbance mixing of the flue gas that has tangentially entered the dechlorination tower from the lower part and the liquid alkali tangentially entering from the upper part can be increased due to the reverse flow directions, which extend the reaction time and gives sufficient settling space of the flue dust.

6. The flue gas treatment adopts a two-stage baghouse, wherein the first stage baghouse is configured to filter the dust and a second stage baghouse is configured to filter the dust and denitrate, so that both the NOx content and the dust content of the flue gas at the outlet of the dechlorination tower reach an ultralow emission degree. the clean flue gas enters the activated carbon packed tower and is subjected to dioxin adsorption removal again, the cleaning of the flue gas increases the service life of the activated carbon. The flue gas treatment apparatus achieves the functions of dust removal, denitration and subtracting of the dioxin, avoids limitation of the temperature of the flue gas by SCR denitration and avoids a plight that a large amount of dangerous waste water generated by wet tower cannot be treated.

In the figure: 1—water-cooled feed hopper, 2—water-cooled grate, 3—chamber, 4—front arch, 4-1—front secondary air pipe, 5—rear arch, 5-1—rear secondary air pipe, 6—side wall, 6-1—side secondary air pipe, 7—dechlorination tower, 8—dry desulfurization device, 9—liquid alkali nozzle, 10—baghouse, 11—denitration catalytic fabric filter, 12—activated carbon packed tower.

DETAILED DESCRIPTION OF THE EMBODIMENTS

Hereinafter, specific embodiments of the present disclosure will be described in detail with reference to the figures. It should be understood that the specific embodiments described herein are only by way of illustration, explanation and not limitation.

Figure 1:
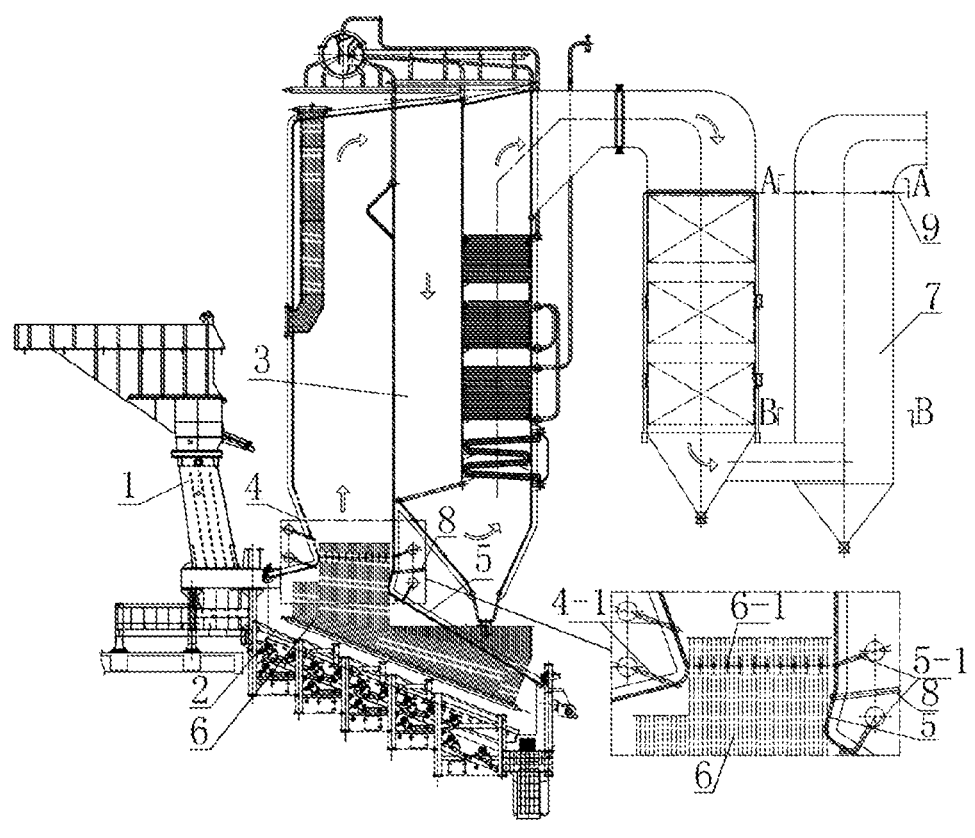
FIG. 1 is a structural schematic diagram of the present disclosure.
Figure 2:
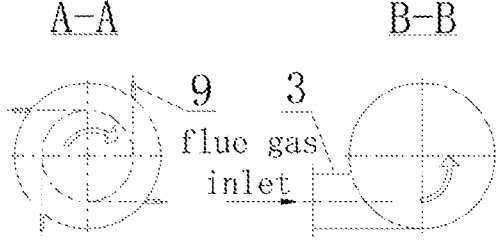
FIG. 2 is a top view of the structure taken along the lines A-A, B-B in FIG. 1 of the present disclosure.

As shown in FIGS. 1 and 2, an industrial solid waste incinerator and flue gas treatment apparatus, comprising a water-cooled feed hopper 1, a water-cooled grate 2 and a chamber 3, wherein the water-cooled feed hopper 1 is arranged at the front of the water-cooled grate 2, a front arch 4, a rear arch 5 and left and right side walls 6 are arranged above the water-cooled grate 2, and the front arch 4, the rear arch 5 and the left and right side walls 6 are formed of membrane water-cooled walls. A dechlorination tower 7 is arranged behind the chamber 3.

Two sets, i.e. an upper set and a lower set, of front secondary air pipes 4-1 are arranged on the front arch 4. Two sets, i.e. an upper set and a lower set, of rear secondary air pipes 5-1 are arranged on the rear arch 5. The left and right side walls 6 are each provided with a set of side secondary air pipes 6-1. A dry desulfurization device 8 is arranged between the two sets of rear air pipes 5-1.

The flue gas at an outlet of the chamber 3 tangentially enters a lower part of the dechlorination tower 7. Liquid alkali nozzles 9 are arranged on an upper part of the dechlorination tower, tangentially with respect to a circle. Liquid alkali jet and the flue gas swirl flow in reverse directions.

Figure 3:
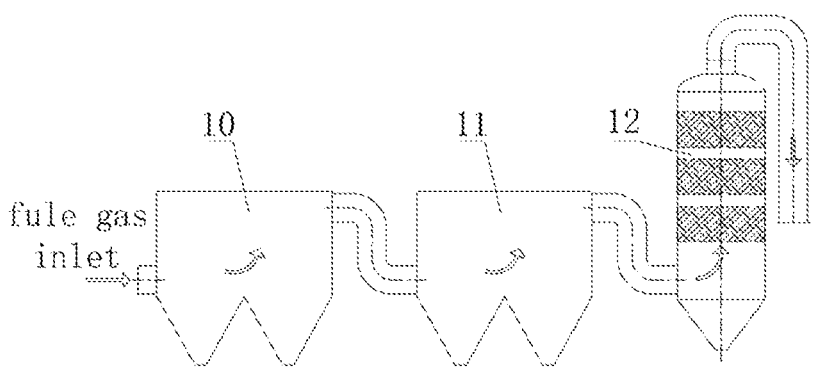
FIG. 3 is a structural schematic diagram of a flue gas treatment apparatus of the present disclosure.

As shown in FIG. 3, the flue gas at an outlet of the dechlorination tower 7 is filtered by a primary baghouse 10 and a secondary denitration catalytic fabric filter 11, and then passes through an activated carbon packed tower 12 to absorb the dixon.

The above embodiments are only used to describe the technical solutions of the present disclosure, but not to limit the present disclosure; although the present disclosure is described in detail with reference to the foregoing embodiments, it should be understood by those skilled in the art that the technical solutions described in the foregoing embodiments can still be modified or equivalent replacement of some or all of the technical features thereof; These modifications or replacements do not depart from the scope of the technical solutions of the embodiments of the present disclosure.

What is claimed is:

1. An industrial solid waste incinerator and flue gas treatment apparatus, comprising a water-cooled feed hopper, a water-cooled grate and a chamber which are connected in sequence, wherein a front arch, a rear arch and side walls, which are formed of membrane water-cooled walls, are provided between the water-cooled grate and the chamber, a dechlorination tower is arranged behind the chamber, two sets of rear secondary air pipes, which comprises an upper set of rear secondary air pipes and a lower set of rear secondary air pipes, are arranged on the rear arch, a dry desulfurization device is arranged between the two sets of rear secondary air pipes.

2. The industrial solid waste incinerator and flue gas treatment apparatus according to claim 1, wherein the front arch, the rear arch and the side walls are provided with secondary air pipes.

3. The industrial solid waste incinerator and flue gas treatment apparatus according to claim 1, wherein an outlet pipe of the chamber is tangentially connected to a lower part of the dechlorination tower, so that the flue gas at an outlet of the chamber tangentially enters the lower part of the dechlorination tower, and liquid alkali nozzles are arranged on an upper part of the dechlorination tower, tangentially with respect to a circle, so that a liquid alkali jet from the liquid alkali nozzles and a swirl flow of the flue gas flow in reverse directions.

4. The industrial solid waste incinerator and flue gas treatment apparatus according to claim 1, wherein the flue gas at an outlet of the dechlorination tower is sequentially filtered by a primary baghouse and a secondary denitration catalytic fabric filter, and then is discharged through an activated carbon packed tower.

* * * * *